US012372930B2

(12) United States Patent
Yang et al.

(10) Patent No.: US 12,372,930 B2
(45) Date of Patent: Jul. 29, 2025

(54) RECIPE VERIFYING METHOD, RECIPE VERIFYING SERVER, AND SMART MANUFACTURING CONTROLLING SYSTEM USING THE SAME

(71) Applicant: UNITED MICROELECTRONICS CORP., Hsinchu (TW)

(72) Inventors: Tzu-Chung Yang, Tainan (TW); Ping-Yao Chiang, Kaohsiung (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 501 days.

(21) Appl. No.: 17/539,337

(22) Filed: Dec. 1, 2021

(65) Prior Publication Data
US 2023/0168650 A1 Jun. 1, 2023

(51) Int. Cl.
*G05B 19/042* (2006.01)
*G06F 3/0481* (2022.01)
*G06F 3/14* (2006.01)

(52) U.S. Cl.
CPC ......... *G05B 19/042* (2013.01); *G06F 3/0481* (2013.01); *G06F 3/14* (2013.01); *G05B 2219/2643* (2013.01)

(58) Field of Classification Search
None
See application file for complete search history.

(56) References Cited

U.S. PATENT DOCUMENTS

| | | | | |
|---|---|---|---|---|
| 6,165,805 A | * | 12/2000 | Steffan | H01L 22/20 438/18 |
| 6,415,193 B1 | * | 7/2002 | Betawar | G05B 19/41865 700/121 |
| 6,665,575 B2 | * | 12/2003 | Betawar | G05B 19/41865 700/121 |
| 6,834,370 B1 | * | 12/2004 | Brandl | G05B 19/41865 715/201 |
| 7,047,101 B1 | * | 5/2006 | Young | G05B 19/41875 700/121 |
| 7,248,936 B1 | * | 7/2007 | Holmes | G05B 19/41875 717/126 |

(Continued)

FOREIGN PATENT DOCUMENTS

| | | | |
|---|---|---|---|
| JP | 2013117465 A | * | 6/2013 |
| JP | 2014190821 A | * | 10/2014 |
| WO | WO-2015053195 A1 | * | 4/2015 ........... G05B 19/042 |

*Primary Examiner* — Jason Lin
(74) *Attorney, Agent, or Firm* — WPAT, PC

(57) ABSTRACT

A recipe verifying method, a recipe verifying server, and a smart manufacturing controlling system using the same are provided. The recipe verifying method includes the following steps. An inputting recipe having a plurality of inputting parameters is intercepted. The inputting recipe is transmitted from one of the inspection apparatuses. A target best known method (BKM) recipe is searched out from a plurality of candidate BKM recipes according to the inputting recipe. A plurality of predetermined limitations are obtained according to the target BKM recipe. Whether the inputting parameters of the inputting recipe meet the predetermined limitations is determined. An error report is generated, if the inputting parameters of the inputting recipe do not meet the predetermined limitations. At least one error is heighted in the error report.

9 Claims, 6 Drawing Sheets

(56) References Cited

U.S. PATENT DOCUMENTS

| | | | | |
|---|---|---|---|---|
| 7,283,882 B1* | 10/2007 | Bransky | G05B 19/408 | 700/96 |
| 7,565,620 B1* | 7/2009 | Kershaw | G06F 3/0481 | 715/781 |
| 8,209,042 B2* | 6/2012 | Yamamoto | G05B 19/41865 | 700/121 |
| 8,612,886 B2* | 12/2013 | Silvestro | G05B 19/0426 | 715/809 |
| 8,942,840 B2* | 1/2015 | Chen | G05B 19/41865 | 700/121 |
| 9,280,151 B2* | 3/2016 | Chang | G05B 19/41865 | |
| 9,418,413 B1* | 8/2016 | Koren | G05B 19/41875 | |
| 9,934,351 B2* | 4/2018 | Cantwell | G03F 7/705 | |
| 10,534,356 B2* | 1/2020 | Gonzalez | G05B 19/4189 | |
| 2002/0055804 A1* | 5/2002 | Betawar | G05B 19/41865 | 700/121 |
| 2002/0075297 A1* | 6/2002 | Boulter | H04L 43/00 | 715/736 |
| 2002/0183950 A1* | 12/2002 | Fu | G06F 40/194 | 702/84 |
| 2003/0204281 A1* | 10/2003 | Su | G05B 19/41865 | 700/121 |
| 2006/0020362 A1* | 1/2006 | Morinaga | G05B 19/41865 | 700/121 |
| 2008/0065696 A1 | 3/2008 | Ahmed et al. | | |
| 2010/0049959 A1* | 2/2010 | Arcese | G06F 9/4401 | 713/1 |
| 2013/0036103 A1* | 2/2013 | Lawson | G06F 21/64 | 707/698 |
| 2015/0316898 A1* | 11/2015 | Grigoryev | G05B 19/4069 | 700/81 |
| 2019/0005422 A1* | 1/2019 | Lee | G06Q 10/0639 | |
| 2019/0080117 A1* | 3/2019 | Degeneve | G06F 9/44505 | |
| 2021/0136035 A1* | 5/2021 | Bacus | H04L 67/125 | |
| 2022/0084856 A1* | 3/2022 | Hiroi | G06T 7/0008 | |
| 2022/0334172 A1* | 10/2022 | Hayakawa | G05B 23/0281 | |

* cited by examiner

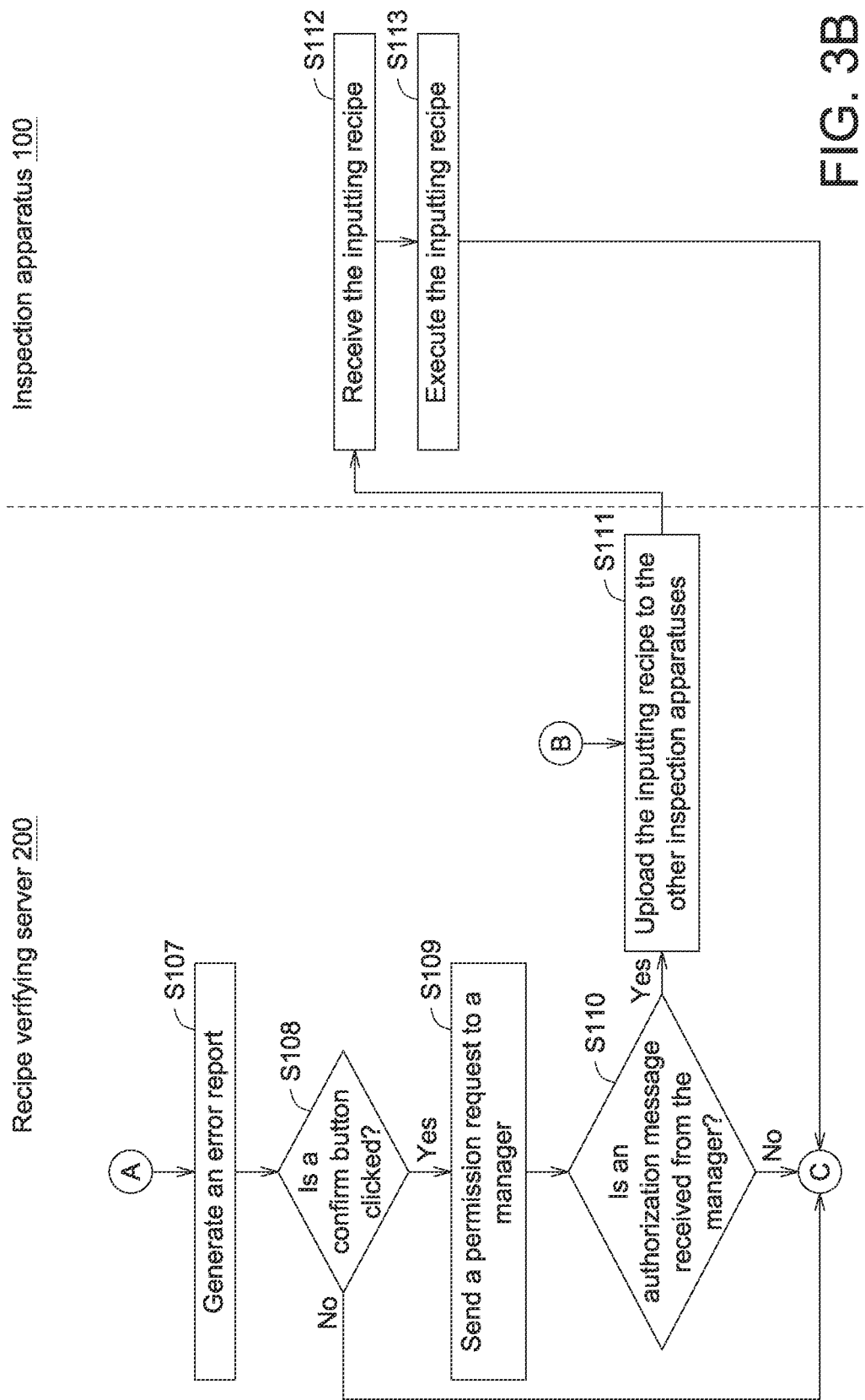

FIG. 5

| BASE | LAYER | ERROR PARAMETER | SPECTRAL_MODE | SIZE | OFFSET | MAX |
|---|---|---|---|---|---|---|
| AK46 | CONTAD1 | Offsets | Deepband_DUV | 0.09 | 23 | 25 |
| BKM | CONTAD1 | | Deepband_DUV | 0.09 | 20 | 25 |
| AQ43 | DIAE1 | Offsets | Broadband_DUV | 0.08 | 12 | 14 |
| BKM3 | DIAE1 | | Broadband_DUV | 0.08 | 13 | 16 |

[Confirm] [Cancel]

FIG. 6

USER ID
PASSWORD
COMMENT

[Send] [Cancel]

RECIPE VERIFYING METHOD, RECIPE VERIFYING SERVER, AND SMART MANUFACTURING CONTROLLING SYSTEM USING THE SAME

TECHNICAL FIELD

The disclosure relates in general to a verifying method, a verifying server, and a manufacturing controlling system using the same, and more particularly to a recipe verifying method, a recipe verifying server, and a smart manufacturing controlling system using the same.

BACKGROUND

Along with the development of the semiconductor technology, the semiconductor manufacturing process becomes more and more complicated. During the semiconductor manufacturing process, the wafer must be monitored by a plurality of inspection apparatuses. For example, the particles must be inspected for prevent any sort issue. The width of the trace must be inspected for prevent any circuit disconnection issue. The engineer may create an inputting recipe to operate those inspection apparatuses. The inputting recipe includes a plurality of inputting parameters of the inspection apparatuses. The inspection apparatus are executed based on those inputting parameters. In order to execute the inspection accurately, any newly created inputting recipe is need to be checked manually.

SUMMARY

The disclosure is directed to a recipe verifying method, a recipe verifying server, and a smart manufacturing controlling system using the same. Once an inputting recipe is uploaded from one of the inspection apparatuses, the inputting recipe is intercepted by a recipe verifying server. Only if the inputting recipe is successfully verified, the inputting recipe will be uploaded to the others of the inspection apparatuses. Therefore, any newly created inputting recipe can be checked automatically for improving the inspection accuracy.

According to one embodiment, a recipe verifying method for a plurality of inspection apparatuses is provided. The recipe verifying method includes the following steps. An inputting recipe having a plurality of inputting parameters is intercepted. The inputting recipe is transmitted from one of the inspection apparatuses. A target best known method (BKM) recipe is searched out from a plurality of candidate BKM recipes according to the inputting recipe. A plurality of predetermined limitations are obtained according to the target BKM recipe. Whether the inputting parameters of the inputting recipe meet the predetermined limitations is determined. An error report is generated, if the inputting parameters of the inputting recipe do not meet the predetermined limitations. At least one error is heighted in the error report.

According to another embodiment, a recipe verifying server is provided. The recipe verifying server includes a communication unit, a storage unit, a searching unit, a processing unit and a report unit. The communication unit is configured to intercept an inputting recipe having a plurality of inputting parameters. The inputting recipe is transmitted from one of a plurality of inspection apparatuses. The storage unit is configured to store a plurality of candidate best known method (BKM) recipes. The searching unit is configured to search out a target BKM recipe from the candidate BKM recipes according to the inputting recipe. The processing unit is configured to obtain a plurality of predetermined limitations according to the target BKM recipe, and determine whether the inputting parameters of the inputting recipe meet the predetermined limitations. The report unit is configured to generate an error report, if the inputting parameters of the inputting recipe do not meet the predetermined limitations. At least one error is highlighted in the error report.

According to an alternative embodiment, a smart manufacturing controlling system is provided. The smart manufacturing controlling system includes a plurality of inspection apparatuses and a recipe verifying server. The recipe verifying server includes a communication unit, a storage unit, a searching unit, a processing unit and a report unit. The communication unit is configured to intercept an inputting recipe having a plurality of inputting parameters. The inputting recipe is transmitted from one of the inspection apparatuses. The storage unit is configured to store a plurality of candidate best known method (BKM) recipes. The searching unit is configured to search out a target BKM recipe from the candidate BKM recipes according to the inputting recipe. The processing unit is configured to obtain a plurality of predetermined limitations according to the target BKM recipe, and determine whether the inputting parameters of the inputting recipe meet the predetermined limitations. The report unit is configured to generate an error report, if the inputting parameters of the inputting recipe do not meet the predetermined limitations. At least one error is highlighted in the error report.

BRIEF DESCRIPTION OF THE DRAWINGS

FIGS. 3A to 3B show a flowchart of a recipe verifying method for a plurality of inspection apparatuses.

FIG. 5 shows an error report according to one example.

FIG. 6 shows a comment window.

Figure 1:
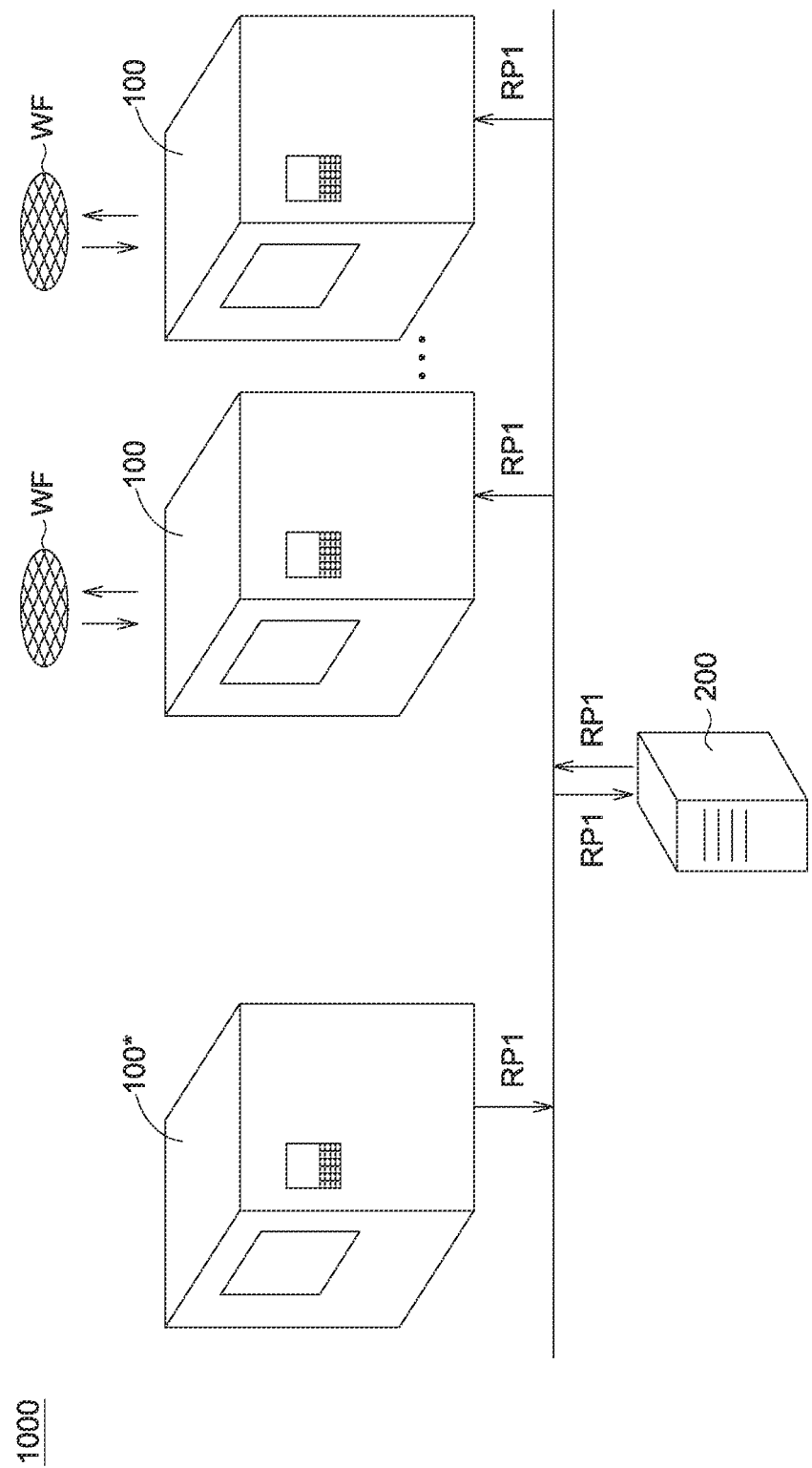
FIG. 1 shows a smart manufacturing controlling system 1000.

In the following detailed description, for purposes of explanation, numerous specific details are set forth in order to provide a thorough understanding of the disclosed embodiments. It will be apparent, however, that one or more embodiments may be practiced without these specific details.

In other instances, well-known structures and devices are schematically shown in order to simplify the drawing.

DETAILED DESCRIPTION

Please referring to FIG. 1, a smart manufacturing controlling system 1000 is shown. The smart manufacturing controlling system 1000 includes a plurality of inspection apparatuses 100*, 100 and a recipe verifying server 200. The inspection apparatus 100*, 100 may be a wafer automatic optical inspection apparatus, an optical microscope apparatus or a die cutting appearance inspection apparatus. The inspection apparatuses 100*, 100 are used to inspect any pollution, scratch, metal residue, photoresist residue or edge chipping. Due to the pattern on one lot of the wafers WF is unique, the engineer must create a particular inputting recipe RP1 to operate the inspection apparatuses 100 for those wafers WF.

For example, the engineer may create the inputting recipe RP1 via the inspection apparatus 100*, and then upload the inputting recipe RP1 to the other inspection apparatus 100. The recipe verifying server 200 may intercept the inputting recipe RP1 and then automatically check the inputting recipe RP1. If the inputting recipe RP1 is successfully verified, then the inputting recipe RP1 can be uploaded to the other inspection apparatus 100. For example, the recipe verifying server 200 may be a server, a computer or a computer cluster.

Figure 2:
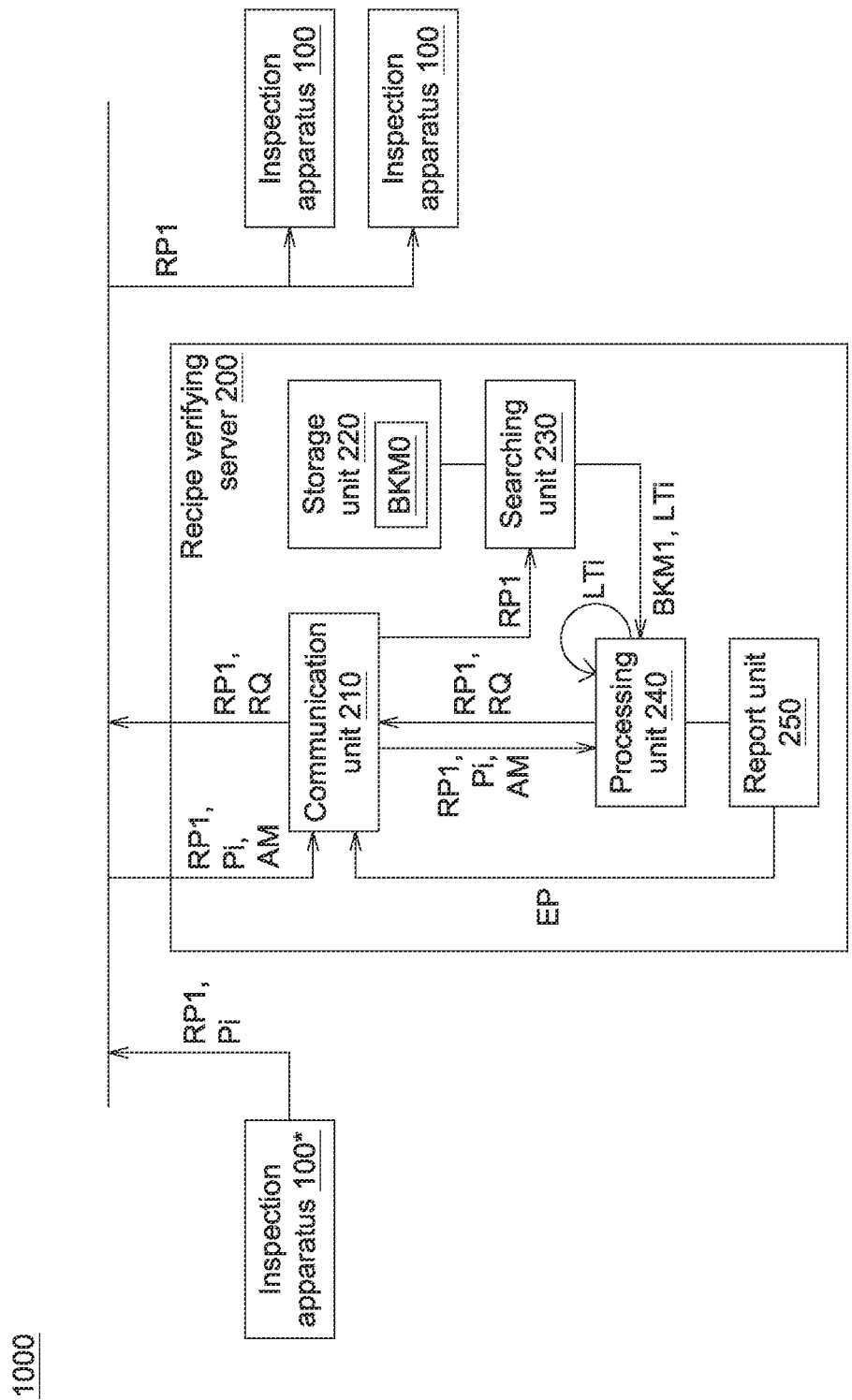
FIG. 2 shows a block diagram of the smart manufacturing controlling system.

Please refer to FIG. 2, which shows a block diagram of the smart manufacturing controlling system 1000. The recipe verifying server 200 includes a communication unit 210, a storage unit 220, a searching unit 230, a processing unit 240 and a report unit 250. The functions of those elements are described as below. The communication unit 210 is used to transmit and receive data. The communication unit 210 may be, for example, a Wi-Fi module, a network communication module, or a LET communication module.

The storage unit 220 is used to store data. The storage unit 220 may be, for example, a disk, a memory or a cloud storing center. The processing unit 240 is used to perform a processing procedure or an analyzing procedure. The report unit 250 is used to generate a report. The searching unit 230, the processing unit 240 and/or the report unit 250 may be, for example, a circuit, a chip, a circuit board, a computer program code or a non-transitory computer readable medium.

Once the inputting recipe RP1 is uploaded from the inspection apparatus 100*, the inputting recipe RP1 is intercepted by the recipe verifying server 200. Only if the inputting recipe RP1 is successfully verified, the inputting recipe RP1 will be uploaded to other inspection apparatuses 100. The operations of those elements are described via a flowchart.

Figure 3A:
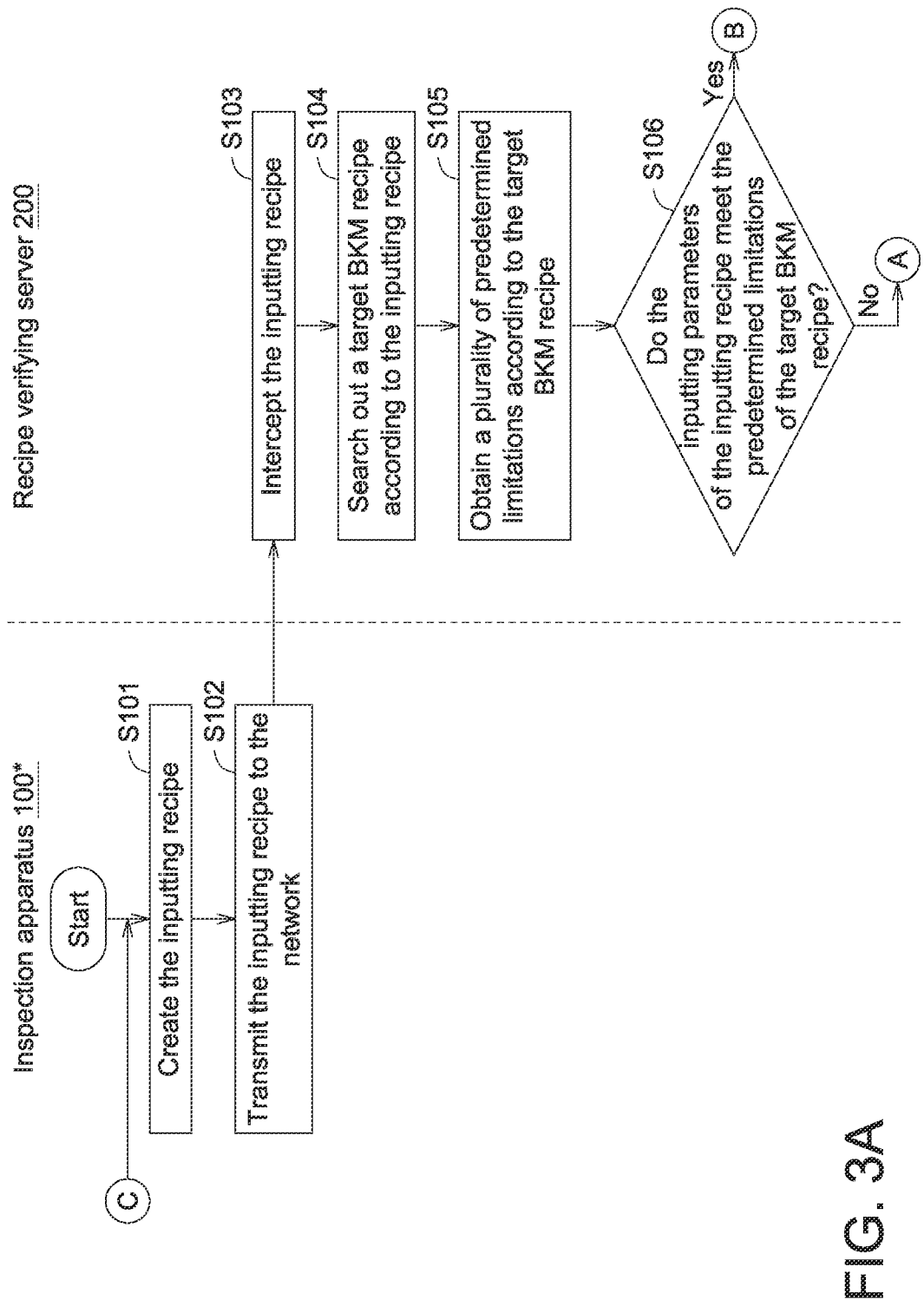
Figure 4:
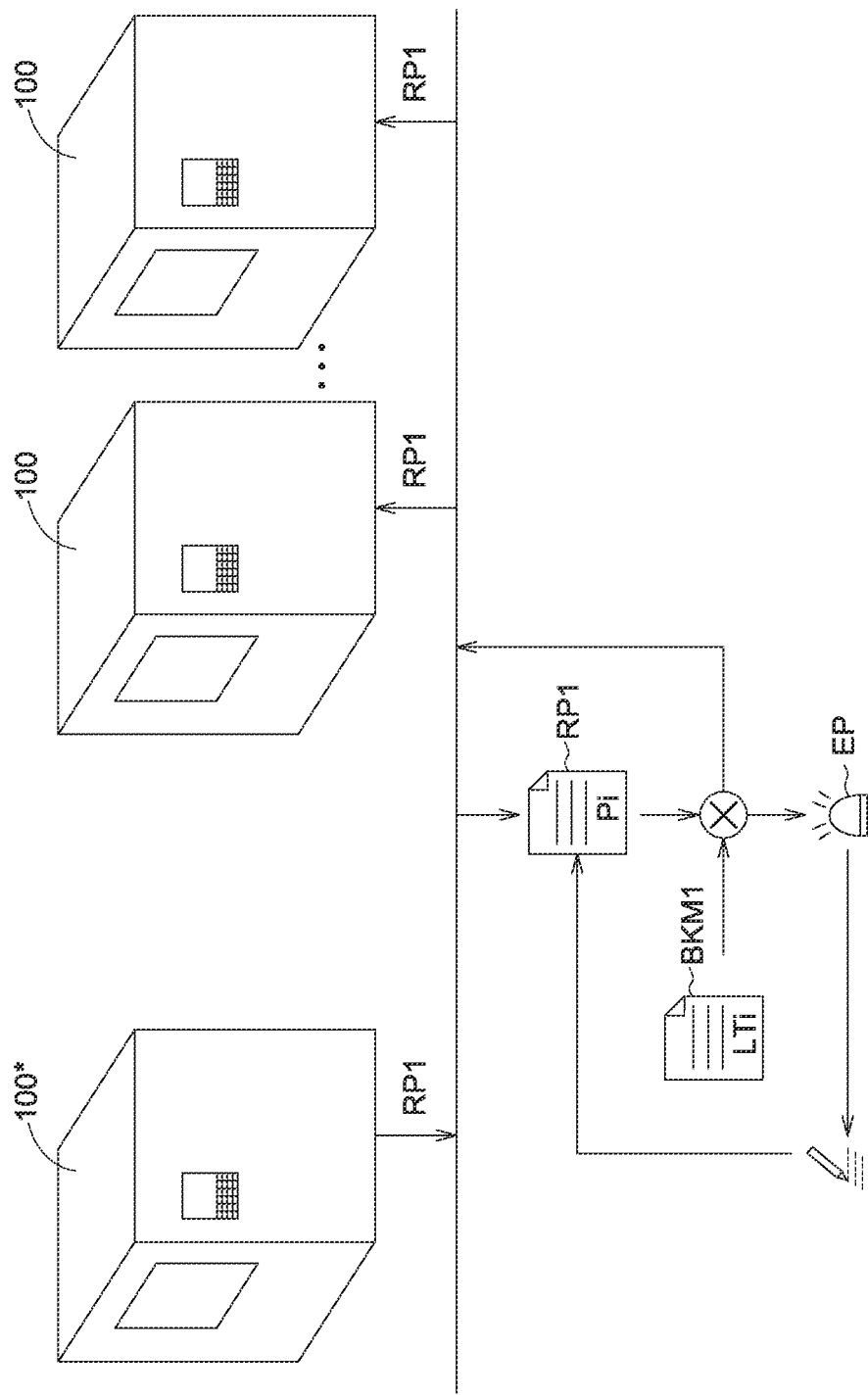
FIG. 4 shows a data flow in the recipe verifying method.

Please refer to FIGS. 3A, 3B and 4. FIGS. 3A to 3B show a flowchart of a recipe verifying method for the inspection apparatuses 100*, 100.

FIG. 4 shows a data flow in the recipe verifying method. In step S101, the inputting recipe RP1 is created via the inspection apparatuses 100*. The inputting recipe RP1 has a plurality of inputting parameters Pi, such as scanning range, pixel size, moving step, and etc. The inputting recipe RP1 is created based on the process stage of the wafer WF (shown in FIG. 1). For example, one inspection apparatus may execute the inputting recipe to inspect the die cutting appearance. Or, one inspection apparatus may execute the inputting recipe to inspect any particle.

Next, in step S102, the inspection apparatus 100* transmits the inputting recipe RP1 to the network.

Then, in step S103, the communication unit 210 of the recipe verifying server 200 intercepts the inputting recipe RP1. In one embodiment, the communication unit 210 periodically monitors the inspection apparatus 100* to intercept the inputting recipe RP1.

Then, in step S104, the searching unit 230 of the recipe verifying server 200 searches out a target best known method (BKM) recipe BKM1 from a plurality of candidate BKM recipes BKM0 according to the inputting recipe RP1. The candidate BKM recipes BKM0 are stored in the storage unit 220. The candidate BKM recipes BKM0 are classified based on the process stage, the manufacturing apparatus and the layer. The inputting recipe RP1 may be assigned into one classification based on the process stage, the manufacturing apparatus and the layer. So, in this step, the searching unit 230 can search out the target BKM recipe BKM1 according to the classification of the inputting recipe RP1.

Afterwards, in step S105, the processing unit 240 obtains a plurality of predetermined limitations LTi according to the target BKM recipe BKM1. The predetermined limitation LTi may be a particular value, a range or a logic combination thereof. For example, "+, −, *, /, ( ), =, >, <, and, or" may be used to described the predetermined limitation LTi.

Next, in step S106, the processing unit 240 determines whether the inputting parameters Pi of the inputting recipe RP1 meet the predetermined limitations LTi of the target BKM recipe BKM1. If the inputting parameters Pi of the inputting recipe RP1 do not meet the predetermined limitations LTi of the target BKM recipe BKM1, the process proceeds to step S107; if the inputting parameters Pi of the inputting recipe RP1 meet the predetermined limitations LTi of the target BKM recipe BKM1, the process proceeds to step S111.

In step S107, the report unit 250 generates an error report EP. For example, please refer to FIG. 5, which shows the error report EP according to one example. In the error report EP, the inputting recipes RP11, RP12 and the target BKM recipes BKM11, BKM12 are shown. At least one error is highlighted in the error report EP. For example, a first color, such as green, is used for presenting the inputting parameter P111 which meet the predetermined limitation LT111 and a second color, such as red, is used for presenting the inputting parameter P121 which does not meet the predetermined limitation LT121. The first color is different from the second color. The inputting parameter P121 is highlighted with red color in the error report EP.

The error report EP may be shown on a display of the recipe verifying server 200. Or, the error report EP may be transmitted to the inspection apparatus 100* and then shown on a display of the inspection apparatus 100*. Or, the error report EP may be transmitted to a mobile device of the user and then shown on a display of the mobile device. The user can clearly see the errors on the error report EP. As shown in FIG. 4, the user can further modify the inputting recipe RP1 according to the error report EP.

Next, referring to FIG. 5, in step S108, the processing unit 240 determines whether a confirm button B1 is clicked. The error report EP is displayed with the confirm button B1. If the confirm button B1 is clicked, the process proceeds to step S109. Please refer to FIG. 6, which shows a comment window W1. After the confirm button B1 is clicked, the comment window W1 is popped up. The user keys in the user identity number ID, the password WD and the comment CM. The user may write the requesting reason for the permission of the inputting recipe RP1.

In step S109, the communication unit 210 sends a permission request RQ to a manager. The permission request RQ includes the comment CM and the error report EP. In one case, the inputting recipe RP1 may be created for a new process, so the inputting parameters Pi of this inputting recipe RP1 cannot meet the predetermined limitations LTi of the target BKM recipe BKM1. For this new process, the newly created inputting recipe RP1 can be permitted by the manager.

Next, in step S110, the processing unit 240 determines whether an authorization message AM is received from the manager. If the authorization message AM is received from the manager, the process proceeds to step S111.

Then, in step S111, the upload unit 260 uploads the inputting recipe RP1 to the other inspection apparatuses 100.

Afterwards, in step S112, each of the inspection apparatuses 100 receives the inputting recipe RP1.

Then, in step S113, each of the inspection apparatuses 100 executes the inputting recipe RP1.

According to the embodiments described above, once the inputting recipe RP1 is uploaded from the inspection apparatus 100*, the inputting recipe RP1 is intercepted by the recipe verifying server 200. Only if the inputting recipe RP1 is successfully verified, the inputting recipe RP1 will be uploaded to other inspection apparatuses 100. Therefore, any newly created inputting recipe RP1 can be checked automatically for improving the inspection accuracy.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A recipe verifying method for a plurality of inspection apparatuses, comprising:
    intercepting an inputting recipe having a plurality of inputting parameters, wherein the inputting recipe is transmitted from one of the inspection apparatuses to another inspection apparatus, a direct connection path connecting the inspection apparatuses is periodically monitored to intercept the inputting recipe;
    searching out a target best known method (BKM) recipe from a plurality of candidate BKM recipes according to the inputting recipe;
    obtaining a plurality of predetermined limitations according to the target BKM recipe;
    determining that the inputting parameters of the inputting recipe do not meet the predetermined limitations;
    generating an error report in respone to that the inputting parameters of the inputting recipe do not meet the predetermined limitations, wherein at least one error is heighted in the error report;
    determining that a confirm button is clicked;
    sending a permission request to a manager in response to that the confirm button is clicked;
    determining that the manager permitted the permission request; and
    executing the inputting recipe in response to determining that the manager permitted the permission request.

2. The recipe verifying method for the inspection apparatuses according to claim 1, further comprising:
    uploading the inputting recipe to the another inspection apparatus in response to that the inputting parameters of the inputting recipe meet the predetermined limitations.

3. The recipe verifying method for the inspection apparatuses according to claim 1, wherein the target BKM recipe is searched out according to a classification of the inputting recipe.

4. A recipe verifying server, comprising:
    a communication unit, configured to periodically monitor a direct connection path connecting an inspection apparatus and another inspection apparatus to intercept an inputting recipe having a plurality of inputting parameters when the inspection apparatus transmits the inputting recipe to the another inspection apparatus;
    a storage unit, configured to store a plurality of candidate best known method (BKM) recipes;
    a searching unit, configured to search out a target BKM recipe from the candidate BKM recipes according to the inputting recipe;
    a processing unit, configured to obtain a plurality of predetermined limitations according to the target BKM recipe, and determine whether the inputting parameters of the inputting recipe meet the predetermined limitations; and
    a report unit, configured to generate an error report in response to that the inputting parameters of the inputting recipe do not meet the predetermined limitations, wherein at least one error is highlighted in the error report;
    wherein the processing unit is further configured to determine whether a confirm button is clicked, and the communication unit is further configured to send a permission request to a manager in response to that the confirm button is clicked;
    the processing unit is further configured to determine that the manager permitted the permission request; and
    wherein the inputting recipe is executed in response to determining that the manager permitting the permission request.

5. The recipe verifying server according to claim 4, wherein the communication unit is further configured to upload the inputting recipe to the another inspection apparatus in response to that the inputting parameters of the inputting recipe meet the predetermined limitations.

6. The recipe verifying server according to claim 4, wherein the searching unit searches out the target BKM recipe according to a classification of the inputting recipe.

7. A smart manufacturing controlling system, comprising:
    a plurality of inspection apparatuses; and a recipe verifying server, comprising:
    a communication unit, configured to periodically monitor a direct connection path connecting an inspection apparatus and another inspection apparatus to intercept an inputting recipe having a plurality of inputting parameters when the inspection apparatus transmits the inputting recipe to the another inspection apparatus;
    a storage unit, configured to store a plurality of candidate best known method (BKM) recipes;
    a searching unit, configured to search out a target BKM recipe from the candidate BKM recipes according to the inputting recipe;
    a processing unit, configured to obtain a plurality of predetermined limitations according to the target BKM recipe, and determine whether the inputting parameters of the inputting recipe meet the predetermined limitations; and
    a report unit, configured to generate an error report in response to that the inputting parameters of the inputting recipe do not meet the predetermined limitation, wherein at least one error is highlighted in the error report;
    wherein the processing unit is further configured to determine whether a confirm button is clicked, and the communication unit is further configured to send a permission request to a manager, if the confirm button is clicked;
    the processing unit is further configured to determine that the manager permitted the permission request; and
    wherein the inputting recipe is executed in response to determining that the manager permitted the permission request.

8. The smart manufacturing controlling system according to claim 7, wherein the communication unit is further configured to upload the inputting recipe to the another inspection apparatus in response to that the inputting parameters of the inputting recipe meet the predetermined limitations.

9. The smart manufacturing controlling system according to claim 7, wherein the searching unit searches out the target BKM recipe according to a classification of the inputting recipe.

* * * * *